United States Patent [19]

Harde

[11] Patent Number: 4,699,003
[45] Date of Patent: Oct. 13, 1987

[54] FUEL METER FOR VEHICLES

[75] Inventor: Bo Harde, Gothenburg, Sweden

[73] Assignee: AB Volvo, Gothenburg, Sweden

[21] Appl. No.: 776,057

[22] PCT Filed: Jan. 23, 1985

[86] PCT No.: PCT/SE85/00024

§ 371 Date: Sep. 4, 1985

§ 102(e) Date: Sep. 4, 1985

[87] PCT Pub. No.: WO85/03348

PCT Pub. Date: Aug. 1, 1985

[30] Foreign Application Priority Data

Jan. 23, 1984 [SE] Sweden ............................ 8400326

[51] Int. Cl.[4] .................... G01F 23/30; G01F 23/36
[52] U.S. Cl. .................................. 73/313; 73/317; 338/33; 361/91
[58] Field of Search ................ 73/313, 317, 1 H; 338/33; 361/91; 324/110

[56] References Cited

U.S. PATENT DOCUMENTS

| 2,079,485 | 5/1937 | Bousman | 324/110 |
| 2,282,496 | 4/1959 | Greibach | 324/125 |
| 2,516,452 | 7/1950 | De Giers et al. | 340/840.41 X |
| 2,526,006 | 10/1950 | Cress | 324/125 |
| 2,533,091 | 12/1950 | Campani | 340/870.41 |
| 2,536,465 | 1/1951 | Reeves | 340/870.41 |
| 2,560,257 | 7/1951 | Sias | 324/125 |
| 2,844,030 | 7/1958 | Svannel | 73/313 |
| 2,903,646 | 9/1959 | Loos | 324/125 X |
| 3,464,012 | 8/1969 | Webb | 324/115 |
| 4,157,038 | 6/1979 | Yamamoto | 73/317 X |

FOREIGN PATENT DOCUMENTS

| 1516953 | 11/1969 | Fed. Rep. of Germany . |
| 2830054 | 1/1979 | Fed. Rep. of Germany . |
| 2734841 | 2/1979 | Fed. Rep. of Germany . |
| 378412 | 6/1964 | Switzerland . |
| 1122038 | 7/1968 | United Kingdom . |

OTHER PUBLICATIONS

"Electronic Measurements", F. E. Terman et al., p. 1, McGraw Hill, 1952, 2nd Edition.
"Diode Protect Meter from Overloads", P. Blais, Electronics, pp. 85–86, Sep. 6, 1965.

Primary Examiner—Daniel M. Yasich
Attorney, Agent, or Firm—Young & Thompson

[57] ABSTRACT

A float-type fuel meter for vehicles. The float regulates in a known manner the position of a movable contact to a resistor. According to the invention, the resistance is a potentiometric resistor, the movable contact being connected, via a disconnectible series resistance, to an electric measuring device, preferably, a moving coil indicator. An overvoltage protector for the device and a capacitor connected in parallel therewith are arranged so that the protector is energized while the capacitor is de-energized when the series resistance is shunted off.

3 Claims, 6 Drawing Figures $$V_1 = \frac{V_0 R_1}{R_1 + R_2}$$

$$\frac{V_1}{V_0} = \frac{1}{1 + \frac{R_2}{R_1}}$$

FUEL METER FOR VEHICLES

The invention relates to a fuel float type meter for vehicles.

Fuel meters of this general type are commonly used, and in normal cases the resistor is of the rheostat type, i.e. it has the function of an adjustable resistor, and is connected in series with an indicator instrument of bimetallic type, the battery voltage lying across this series connection. When the tank is full, the resistance is low and the indicator instrument registers high current. When the tank is emptied, the resistance increases and the current drops.

As is known to all car owners today, a fuel meter of this type can only give a rather inaccurate information on the quantity of fuel remaining in the tank, even if the condition of the metering equipment is as good as new. This can be explained in many ways. The indicator instrument used is not particularly accurate but its primary advantage is the rugged design and the reasonably low price. The sensor itself, including resistor and float, is furthermore difficult to design as a linear instrument in that the configuration of the tank usually prevents the fuel level from varying linearly with the volume of residual fuel. Although this can be counteracted by making the resistance non-linear, the problem still remains that different car models have different tank shapes, and that in the implemented coupling system having varying resistance in series with a current meter, it will hardly help to make the resistance itself linear in response to the quantity of fuel, and therefore fuel meters giving quite approximate values have had to suffice for this purpose.

A specific problem associated with the previous design is the requirement of vigorously changing the resistance when the fuel level is low for the scale deflection to be appreciable, and it is difficult to obtain a reasonable degree of certainty of the zero point. The instrument often indicates zero although 10 liters or more may still remain in the tank. To overcome this problem, specific solutions have been found necessary such as a separate, connectible reserve tank. The car owner generally finds himself compelled to have a small reserve tank lying loose in the luggage compartment in order to avoid fuel stoppage.

Another example of a frequently practiced method is to connect in series an electric lamp and an NTC resistor to the battery, the NTC resistor being mounted close to the bottom of the tank. When the resistor is exposed as the fuel level lowers, the cooling effect is deteriorated, the resistor becomes warmer and the resistance decreases, the current thereby being sufficiently strong for the lamp to be lit as a warning to the driver. In this way however, only a purely qualitative indication is given, informing that some not too well-defined minimum level has been underpassed.

Also designs with automatic scale shifting have been suggested, which start to function when the fuel level drops below a predetermined value. Examples thereof can be found in U.S. Pat. Nos. 2,533,091 and 4,157,138. The former specification discloses two different rheostatic resistors each having its own movable contact coupled to a single float, one resistor covering only part of the range of movement of the float but having there the same interval of resistance as the other resistor will change for the entire range of the float, there being provided a third movable contact for a changeover of the rheostats' connection to the measuring instrument. At the lower level, the deflection of the instrument therefore shifts from operation on a scale range of 0–100 liters to 0–10 liters, for example. The latter specification shows resistance means connected to the float in the form of two resistors disposed in the respective extension of one another and having equally large resistance, and the slidable contact which is grounded can slide over the upper resistor for e.g. the 10–50 liter range, the upper connection of this resistor producing a resistance to ground varying from the entire resistance value and down to zero, and for the 0–10 liter range across the second, lower resistor, the upper connection of which being united with the uppermost connection of the upper resistor, and when the slider contact passes from one resistor to the other, the resistance sensed by the meter goes from maximum value down to zero.

These known solutions involve several drawbacks, of which the uncertainty in the zero register is the most serious because the subject of measurement is in fact the current flowing through a resistor with variable resistance, the flow of current through the fuel meter thereby varying. If it is desired then to reach a state independent of the battery voltage by inserting a voltage regulator, this must be given high capacity.

Another disadvantage is that the arrangements mentioned such as automatic range shifting will strike back and forth at the range limit due to the fuel splashing in the tank. It is of course possible to have baffle plates installed in fuel tanks, but this will not suffice for eliminating said drawback, which is most disturbing in practice.

An object of the invention is to achieve a fuel meter with a fine scale arrangement providing better accuracy compared to previously used devices and in which the aforementioned drawbacks are essentially removed.

The invention is based on the insight that instead of a rheostatic coupling of the level sensing resistor there should be utilized a potentiometer type resistor, the current flowing through the entire resistance being continuously uniform during the measuring interval, the movable contact however sensing a position-dependent voltage which is conducted to a device such as a moving coil instrument having relatively high internal resistance.

Although the moving coil instrument is preferred at present, it is evident that also other types of voltmeters can be utilized without departing from the inventive concept. A particular advantage is obtained with the potentiometer-type resistor in that it makes linearity easily obtainable. If the level surface of the fuel tank is constant at all levels, the resistance in the potentiometer can be linear. If this is not the case, the resistance can be adjusted for obtaining over the entire range a constant ratio expressed in ohm per liter. If the tank is tapering towards the bottom for example, the resistance must be more slowly variable there than higher up where the tank is wider.

As a result of the good linearity obtainable, it will be possible to directly apply the voltage value from the potentiometer as a correct indication of the contents remaining in the tank. However, the deflection on the instrument scale successively diminishes as the quantity approaches zero. According to the invention it is then possible, by reducing the resistance in the measuring circuit by means of shunting a series resistor, to increase the scale deflection so that, for example, full scale deflection is obtained for 10 liters, thereby making it easy to check how far one can drive without risking fuel stoppage. This changeover is suitably carried out manually by the driver, for example by pressing a button. Taking into consideration the possibility that such a button may accidently be pressed even when the tank is full, by a child for example, it will be necessary to safeguard the instrument against such misadventures and therefore a voltage limiter must be installed for protection. This limiter may preferably consist of a suitable number of forward voltage diodes, which provide good security. These diodes should however be dimensioned for conductivity at a voltage corresponding to less than full scale deflection and should therefore be disconnected at normal position. Zener diodes for such voltages will not normally serve the purpose.

According to a particular embodiment, in which the tank is subdivided into several sections each having its own float, the different resistor means can be connected in series so that the resistance is potentiometer coupled in the lowermost tank, which is the last one to be emptied, whereas the resistance in the tank or tanks situated higher up is rheostat coupled and connected in series with the first-mentioned resistor. The output voltage of the movable contact in the lower tank is then continuously used as an analogue value for the quantity of fuel. As will be explained below, the resistance in the tank or tanks situated higher up is suitably made to vary somewhat quicker, counted in ohm per liter, than in the lower tank, providing in this way good linearity for the entire system.

The invention will now be explained in more detail on the basis of a non-restricting examplary embodiment, illustrated in the drawings.

Figure 1:
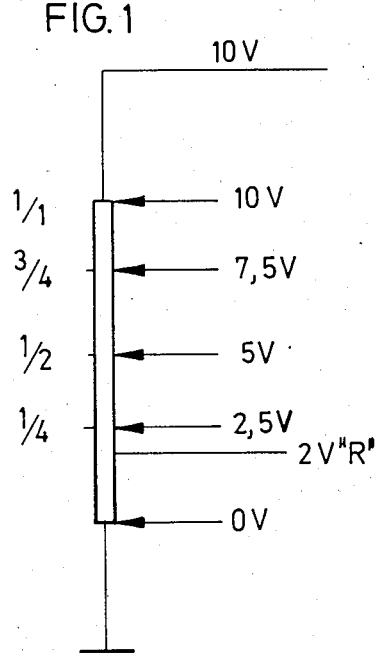
FIG. 1 shows schematically a variable resistor of the type used in float-controlled fuel meters.

FIG. 1 illustrates the principle of the voltage output of a potentiometric fuel indicator. A resistor with a value of 300 ohm, for example, will conduct a current of 33.3 mA when subjected to a voltage of 10 volts. A movable contact consuming only a negligible amount of current will sense a voltage which is entirely dependent of the position of the movable contact. The resistance can be made non-linear and adapted to the shape of a fuel tank so that a movable float, connected to the movable contact, determines the resistance between the movable contact and one of the fixed connections on the resistor. With a change of 5 ohms per liter fuel, there is achieved a varying voltage causing in said example a variation of approximately 0.17 V per liter fuel. This voltage is thus a linear function of the quantity of fuel, if the discharge of current through the movable contact is neglected. If the movable contact is now loaded with a measuring instrument having the finite internal resistance $R_i$ and the resistance of the entire potentiometer is assuemd to be $R_o$, the greatest deviation from linearity will be obtained at the centre where the positive relative value of the error is $R_o/4R_i$. In the position of the slider contact at 10% of the resistance value of the potentiometer, the corresponding positive relative error will be $0.09R_o/R_i$.

In accordance with the invention there is now suggested the possibility of measuring with the instrument firstly, at a setting point where full tank gives full deflection, and secondly, at a setting point where full scale deflection corresponds to 10% of full tank volume. The last-mentioned condition will be obtained upon disconnection of a series connected resistor in the measuring circuit.

If there is then demanded for the electrically dependent error in the amplified measurement to fall below 0.1 liters for a tank volume of 60 liters, and if $R_o$ represents the potentiometer resistance, $R_i$ must thus be at least 1620 ohms. Since the deflection for full tank must correspond to a voltage which is ten times higher, the instrument with series connected resistor should in this case produce a ten times greater resistance, i.e. 16.2 kohms, which results in a maximum error due to the current in the slider contact amounting to 1.8%, or 1.1 liter. In the latter case therefore, the error is non-linear because the correction is an equation of the second degree. As to the deflection for the amplified indication, the non-linearity is less intricate since the deviation from linear error progression is smaller thereby making it possible, by means of a purely linear change of the scale (or a corresponding increase of the resistance by one or a few percent), to improve the precision to a considerable degree and at a low cost.

The interesting point when making these considerations is the fact that an indicator instrument, for example of the moving coil type which has low internal resistance and therefore consumes more current, is less expensive and more robust. It is therefore desirable to use an indicator instrument having the lowest possible internal resistance, without therefore sacrificing linearity or precision.

Figure 2:
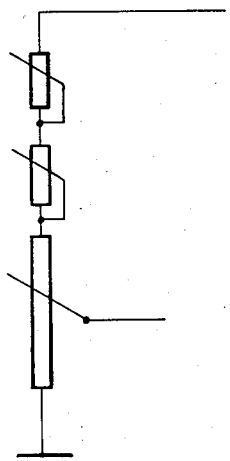
FIG. 2 shows schematically a three-float system.
Figure 4A:
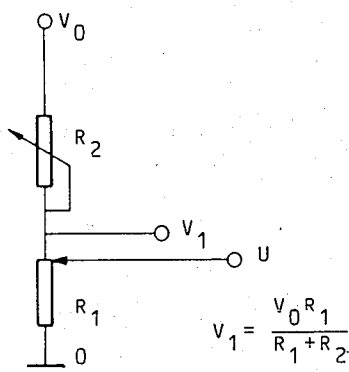
FIG. 4a shows a two-float system with resistance symbols inserted.

According to one aspect of the invention, it is also desired to be able to summarize in one single measuring device the deflection from two tank sensors arranged one on top of the other, the upper tank being emptied first. The lower sensor is thereby arranged with a potentiometer-type connection and the upper sensor with a rheostat-type connection according to FIG. 2 or 4a, wherein emptying of the upper tank leads to the resistor $R_2$ being gradually activated. The measuring voltage U is taken from the slider contact of the lower resistor. Quite evidently, the voltage $V_1$ will now drop, which however does not occur linearly with $R_1$ but in accordance with the equation $$\frac{V_1}{V_0} = \frac{1}{1 + \frac{R_2}{R_1}}$$

Figure 4B:
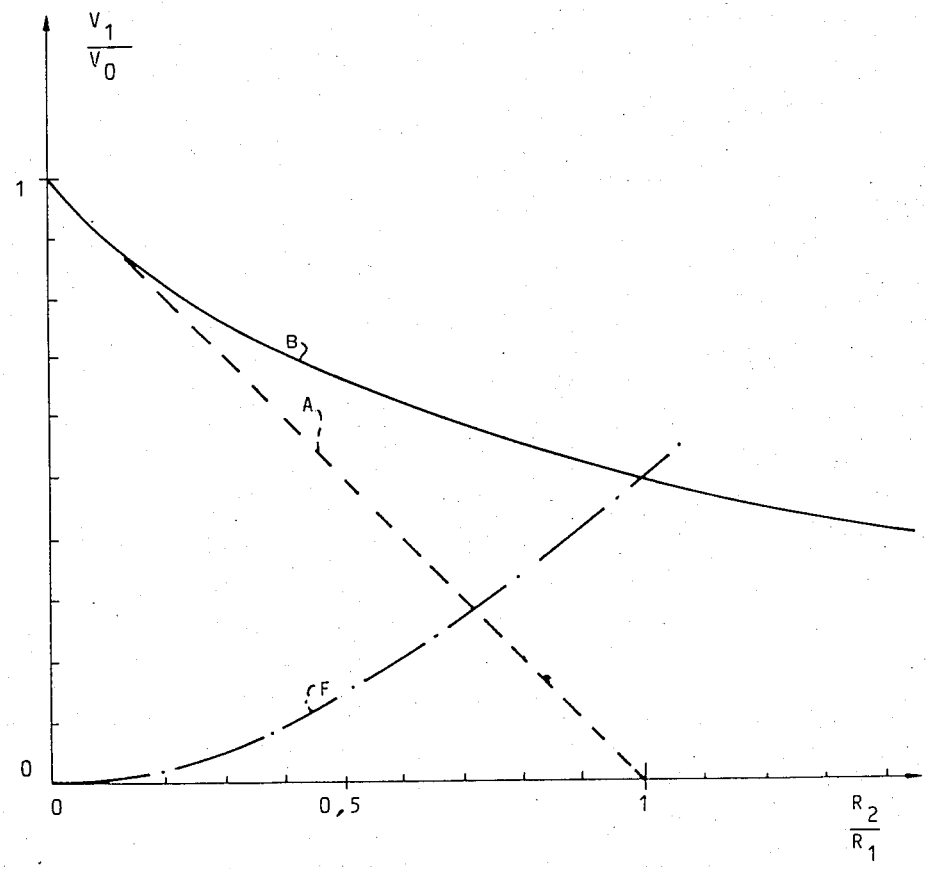
FIG. 4b shows the variation of resistance.
Figure 4C:
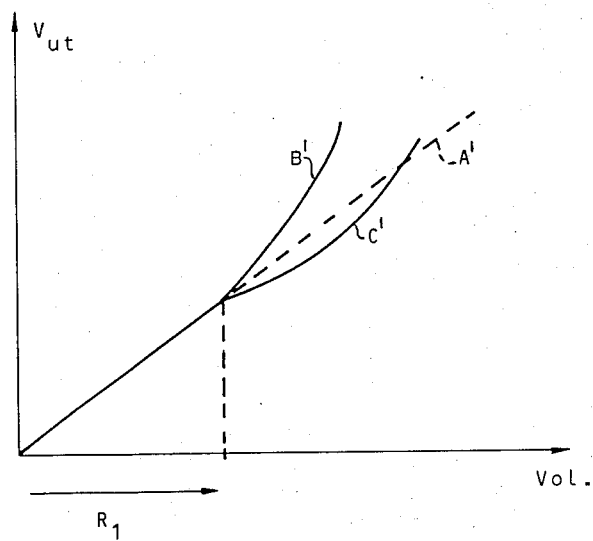
FIG. 4c shows how this can be linearized.

This function is illustrated diagrammatically in FIG. 4b. If $R_2$ is small in relation to $R_1$, the curve can then be approximated with the line A, which means that if $R_2$ fluctuates by the same amount of ohm per liter as does $R_1$, no error will occur. If, however, $R_2$ is reasonably great, there will appear a non-linear measuring error amounting in relative measurement to $(R_2/R_1)^2$. The maximum error occurs at one end of the range and varies as illustrated by the dash-dotted curve F in FIG. 4b. The incidence of this error can suitably be diminished by letting the resistor in the upper sensor fluctuate somewhat more rapidly with the volume, enabling in this way improved linearity. This is schematically illustrated in FIG. 4c. As to the lower range, which is determined by the potentiometer-type resistor $R_1$, full linearity is assumed to prevail. For a rheostat-type resistor $R_2$ connected in series therewith there is obtained the arched curve B' which for a start, as it slopes, connects to the linear portion of the curve, if the adjustment in ohm per liter is equal for $R_1$ and $R_2$. It is of course advisable to have the output voltage $V_{out}$ follow the curve A' instead of the curve B'. The situation is then improved if $R_2$ is allowed to have a somewhat higher resistance per liter obtaining in this way the curve C', which adapts better to the curve A'. The appropriate difference in resistance per liter of fuel can be calculated with the guidance of the respective intervals of resistance.

Figure 3:
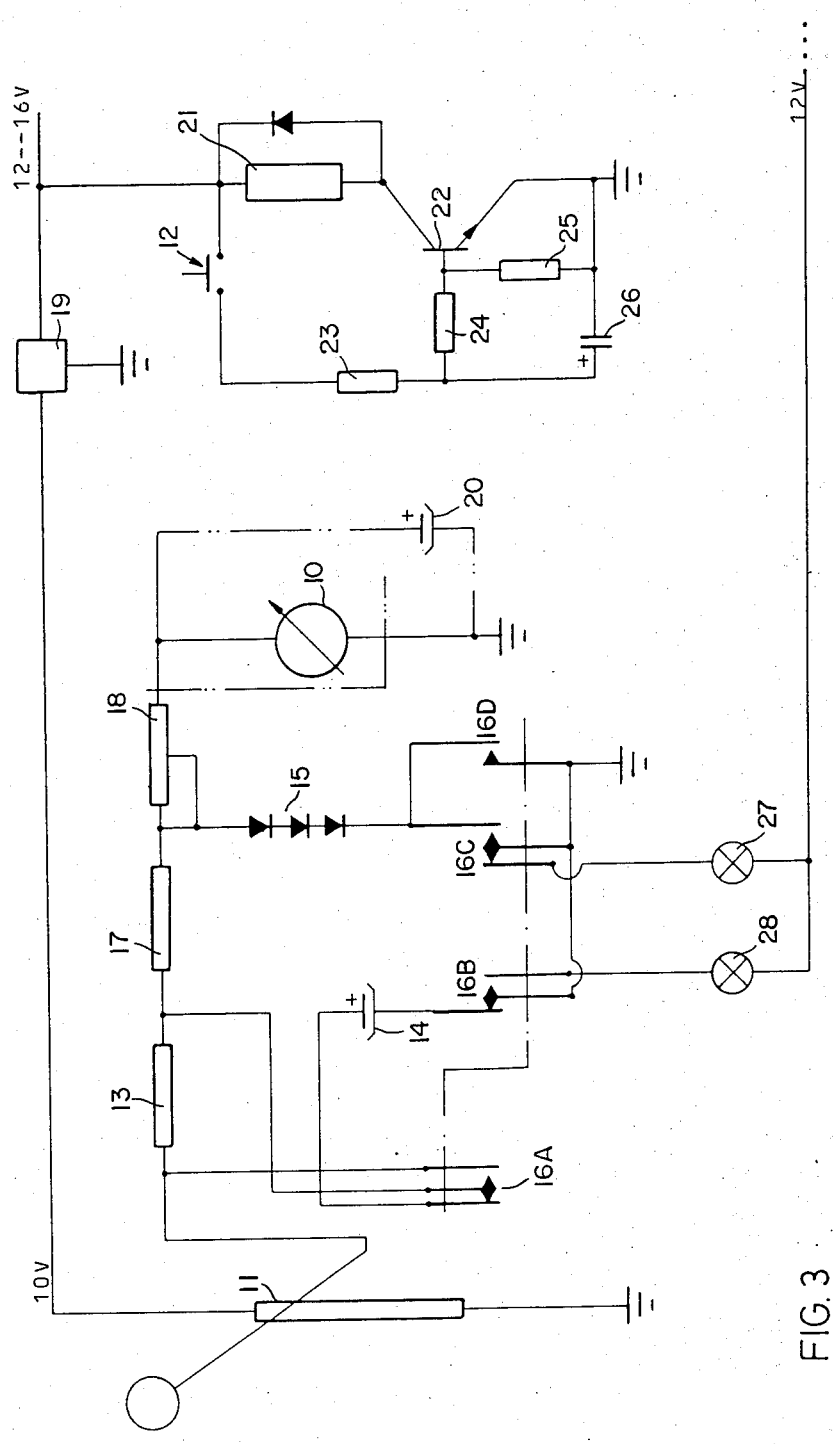
FIG. 3 shows a circuit diagram of an exemplary embodiment of the invention.

FIG. 3 illustrates the connection of an electrical measuring device such as a galvanometer-type instrument 10 to a tank transducer, which is a potentiometer-type 11 resistor. Through a series resistor means 13, for example, 8 Kohm, ¼ watt, and with an internal resistance in the galvanometer of 700 ohm, the load on the transducer will have an impedance in the order of 10 kohm. When the series resistance 13 is shunted off by the left most relay contact 16A, an amplified scale deflection is obtained. There are four relay contacts labelled 16A, 16B, 16C and 16D. This is accomplished by means of a manually operated switch 12 disposed in a relay actuating system. As shown in the figure, the previous voltage to the instrument will simultaneously be stored in a capacitor 14 disposed in series to the series resistance enabling a smooth return by releasing the press button. Furthermore, the relay provides for three series-connected forward voltage diodes 15, for example, 1N 4001, to be connected, said diodes serving to protect the galvanometer from overvoltage or from excess voltage. Also shown are a hundred ohm 2 watt resistor 17 and a 1.2 Kohm ¼ watt rheostat 18 which are coupled in series between the shuntable series resistance 13 and the galvanometer 10. Element 19 is a current limiting device with 220 milliamps maximum, for example, the TCA 700. The capacitor 14 is, for example, 1000 to 2000 microfarads, 16 volts. Element 20 is a capacitor of, for example, 500 microfarads, 3 volts. The relay is element 21 of, for example, 12 volts, 50 milliamps. Element 22 is a transistor of, for example, NPN type, 50 volts/200 milliamps. Resistor 23 may be 1 Kohm, resistor 24 may be 4.7 Kohm, resistor 25 may be 33 Kohm and capacitor 26 may be, for example, 407 microfarads/16 volts or 220 microfarads/16 volts. Element 27 is a scale illumination lamp and element 28 is a relay illumination lamp. The relay 21 may be of the commercial type SF 4T12A, capable of making 1 million shifts in its lifetime. It acts to shift the relay contacts 16.

When disconnected by an RC circuit, the drive circuit of the relay is delayed by about 8 seconds in the illustrated embodiment.

It may be especially observed in the diagram that the grounded terminal of the value-holding capacitor will be released upon switching, creating in this way a double security against engagement of the capacitor without the series resistance being coupled in.

Beyond the aforementioned memory function, the capacitor in the circuit also has the function of damping the instrument against the action of fuel splashing in the tank on one hand, and against mechanical oscillations in the instrument itself on the other hand. When switching over to the more sensitive measuring range, the resistance of the circuit will drop to a value where electrical damping is obtained anyway.

By the invention, improved measurement of the fuel level is made possible both in the ordinary measuring range and in the enlarged scale section thereof. In contrast to prior art devices there is thus obtained a well-defined zero level indication giving a much better information as to the quantity of fuel remaining in the tank. In case an indication lamp for low fuel level should also be desired, this can be accomplished without the need of any additional sensor in the tank itself, thanks to the reliability of the zero level indication. The potentiometer switch can then be readily connected to a threshold circuit guiding a light diode to be lit when the fuel level in the tank drops below a predetermined level.

What is claimed is:

1. A fuel level meter for vehicles including an electrical measuring device comprising: a voltage source; a potentiometer resistor, said resistor comprising two ends connected between said voltage source and a movable contact, connected to a float disposed in a fuel tank, such that the position of the float is dependent on the level of fuel in the tank; a shuntable series resistance with a first side connected to the movable contact and to a first relay switch of a relay and a second side connected both to a first resistor and to the relay switch, the other side of the first resistor being connected to a first side of a rheostat and to an overvoltage protector means; a damping capacitor having one side connected between the relay switch and a second relay switch of the relay operable jointly with the first; said measuring device being connected between a second side of said rheostat and ground; wherein the relay switches are jointly movable between a position wherein a first side of the capacitor and the second side of the shuntable series resistance are both electrically connected to an input terminal of the measuring device such that a current flowing from said movable contact flows through the series resistor and the other side of the capacitor is coupled to a constant voltage, and a second position wherein the series resistance is shunted off, the overvoltage protector means is engaged in parallel with the measuring device, and the capacitor maintains the constant voltage.

2. Fuel meter as claimed in claim 1, characterized in that the relay is provided with a current coil, is activable by means of a manually operated switch.

3. Fuel meter as claimed in claim 1, characterized in that the overvoltage protector means consists of at least one forward voltage coupled semiconductor diode which is connected only when the relay is in the second position.

* * * * *